United States Patent
Kawakami et al.

(10) Patent No.: US 8,712,640 B2
(45) Date of Patent: Apr. 29, 2014

(54) VEHICLE DRIVING ASSISTANCE APPARATUS

(75) Inventors: Kenta Kawakami, Wako (JP); Yoshihiro Urai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 975 days.

(21) Appl. No.: 12/352,890

(22) Filed: Jan. 13, 2009

(65) Prior Publication Data

US 2009/0187313 A1 Jul. 23, 2009

(30) Foreign Application Priority Data

Jan. 21, 2008 (JP) .................................. 2008-010802

(51) Int. Cl.
*B62D 6/00* (2006.01)
*B62D 5/04* (2006.01)

(52) U.S. Cl.
USPC ............... 701/41; 701/70; 701/301; 180/271; 180/446

(58) Field of Classification Search
USPC ............... 701/41, 70, 301; 180/204, 271, 446
See application file for complete search history.

(56) References Cited

U.S. PATENT DOCUMENTS

| | | | |
|---|---|---|---|
| 6,574,559 B2 * | 6/2003 | Shinmura et al. ............. | 701/301 |
| 6,624,747 B1 * | 9/2003 | Friederich et al. ............ | 340/436 |
| 6,718,241 B2 * | 4/2004 | Kondo et al. .................. | 701/41 |
| 7,016,783 B2 * | 3/2006 | Hac et al. ...................... | 701/301 |
| 7,069,129 B2 * | 6/2006 | Iwazaki et al. ................. | 701/41 |
| 7,206,684 B2 * | 4/2007 | Takeda ............................ | 701/70 |
| 2002/0169531 A1 * | 11/2002 | Kawazoe et al. ............... | 701/41 |
| 2004/0158377 A1 * | 8/2004 | Matsumoto et al. ............ | 701/48 |
| 2005/0278096 A1 * | 12/2005 | Iwazaki et al. .................. | 701/41 |
| 2006/0111842 A1 * | 5/2006 | Sugimoto et al. ............. | 701/301 |
| 2007/0203617 A1 * | 8/2007 | Haug ............................... | 701/1 |
| 2007/0225914 A1 * | 9/2007 | Kawazoe et al. ............. | 701/301 |
| 2007/0255474 A1 * | 11/2007 | Hayakawa et al. ............. | 701/70 |
| 2008/0208409 A1 * | 8/2008 | Matsumoto et al. ............ | 701/41 |

FOREIGN PATENT DOCUMENTS

| | | |
|---|---|---|
| JP | 09-277945 A | 10/1997 |
| JP | 11-034774 A | 2/1999 |
| JP | 11-321688 A | 11/1999 |
| JP | 2000-067396 A | 3/2000 |
| JP | 2000-142441 A | 5/2000 |
| JP | 2002-154451 A | 5/2002 |
| JP | 3420581 B2 | 2/2003 |
| JP | 2005-161946 A | 6/2005 |
| JP | 2006-131072 A | 5/2006 |
| JP | 2006-224750 A | 8/2006 |
| JP | 2006-264624 A | 10/2006 |
| JP | 2007-030612 A | 2/2007 |

* cited by examiner

*Primary Examiner* — Drew Brown
*Assistant Examiner* — George Spisich
(74) *Attorney, Agent, or Firm* — Arent Fox LLP

(57) ABSTRACT

In a vehicle driving assistance apparatus having an electric motor to impart steering torque to the driver and a driving control unit that conducts collision avoidance assistance control and other steering control including lane departure prevention control, power steering control and parking assistance control for providing assistance during parking of the vehicle, when a warning for alerting the driver is made by imparting torque to the steering wheel via the motor, the control input of the other steering control is suppressed, i.e. is reduced during either the first predetermined time before warning or the second predetermined time after warning. Owing to this configuration, the driver can be enabled to perceive the warning without fail even when another steering control is performed in parallel.

20 Claims, 7 Drawing Sheets

VEHICLE DRIVING ASSISTANCE APPARATUS

BACKGROUND OF THE INVENTION

1. Field of the Invention

This invention relates to a vehicle driving assistance apparatus, more specifically to an apparatus having an actuator for applying torque to the steering wheel of a vehicle, wherein the actuator is utilized for implementing a number of kinds of control, including collision avoidance assistance control and lane departure prevention control, and for ensuring perceptibility of warnings at the time of making them to the vehicle driver.

2. Description of the Related Art

Japanese Laid-Open Patent Application No. 2006-131072, filed by the present assignee, teaches an example of a known vehicle driving assistance apparatus that has an actuator for imparting torque to the vehicle steering wheel and uses the actuator for implementing multiple kinds of control, such as collision avoidance assistance control for helping the driver avoid hitting obstacles or objects, lane departure prevention control for preventing deviation from the traffic lane (proper course of travel), and ordinary power steering control for helping the driver steer the vehicle.

SUMMARY OF THE INVENTION

In the aforesaid prior art apparatus, when, for example, the collision avoidance assistance control determines that collision is likely, it warns the driver by operating the actuator to apply torque to the steering wheel. However, when other control is being conducted concomitantly, it may be difficult for the driver to notice the warning.

The object of this invention is therefore to overcome this problem by providing a vehicle driving assistance apparatus that conducts multiple kinds of control using a device to impart torque to a steering wheel and uses said device to ensure vehicle driver perceptibility of warnings at the time of making them.

In order to achieve the object, the present invention provides at a first aspect an apparatus for assisting driving of a vehicle having a steering wheel adapted to be manipulated by a driver, and a device to impart torque to the steering wheel when supplied with a control input; comprising: a first controller that supplies the control input to the device to conduct a first steering control; a second controller that supplies the control input to the device to conduct a second steering control; and a control input suppressor that suppresses the control input of at least one of the first steering control and the second steering control, when a warning for alerting the driver is made by at least one of the first controller and the second controller by imparting torque to the steering wheel via the device, during a first predetermined time before the warning or a second predetermined time after the warning.

In order to achieve the object, the present invention provides at a second aspect a method of assisting driving of a vehicle having a steering wheel adapted to be manipulated by a driver, and a device to impart torque to the steering wheel when supplied with a control input; comprising the steps of: conducting a first steering control that supplies the control input to the device; conducting a second steering control that supplies the control input to the device; and suppressing the control input of at least one of the first steering control and the second steering control, when a warning for alerting the driver is made by at least one of the step of conducting the first steering control and the step of conducting the second steering control by imparting torque to the steering wheel via the device, during a first predetermined time before the warning or a second predetermined time after the warning.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment for implementing the vehicle driving assistance apparatus according to this invention is explained in the following with reference to the attached drawing.

Figure 1:
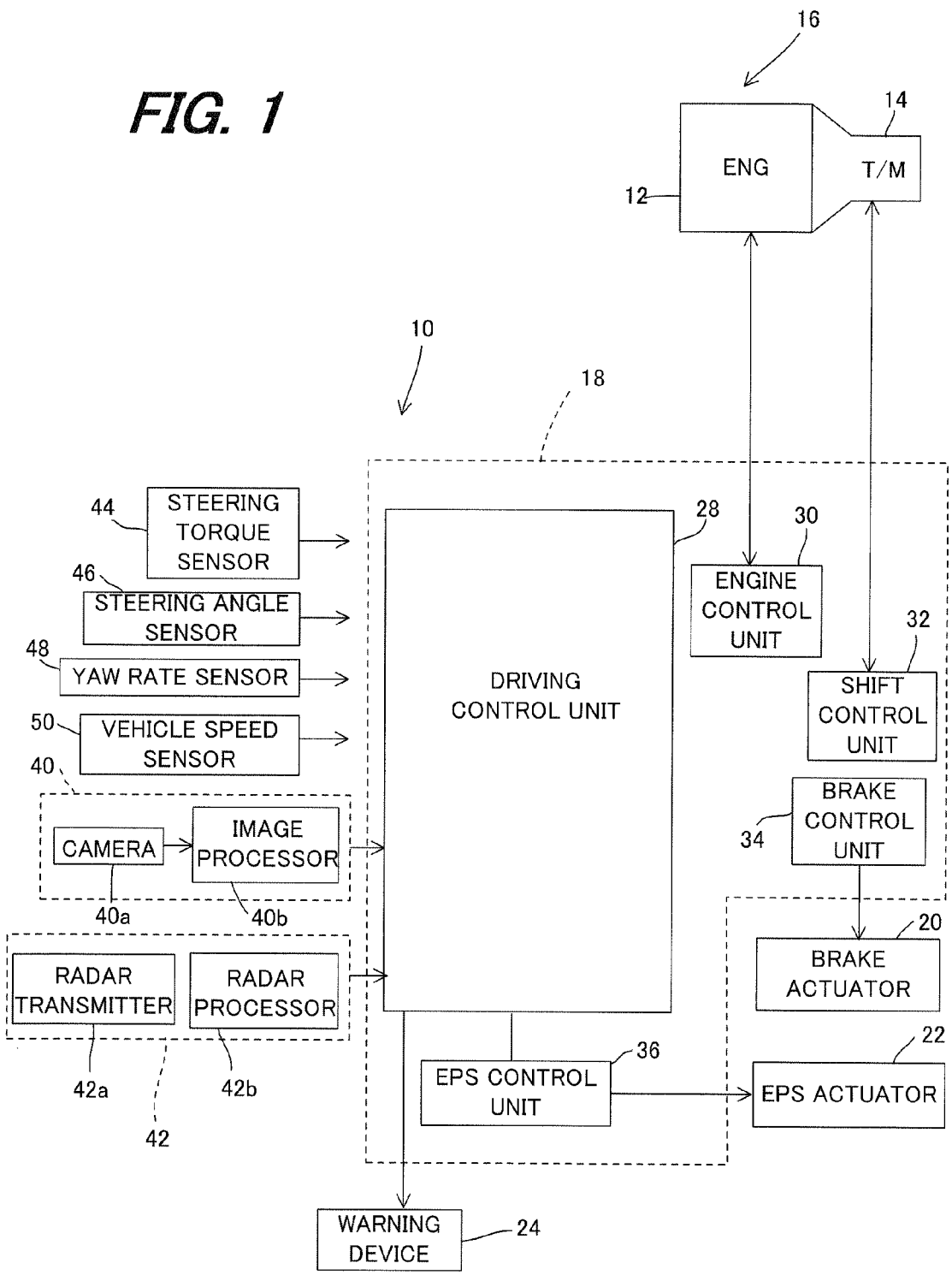
FIG. 1 is an overall schematic view showing a vehicle driving assistance apparatus according to an embodiment of this invention.
Figure 2:
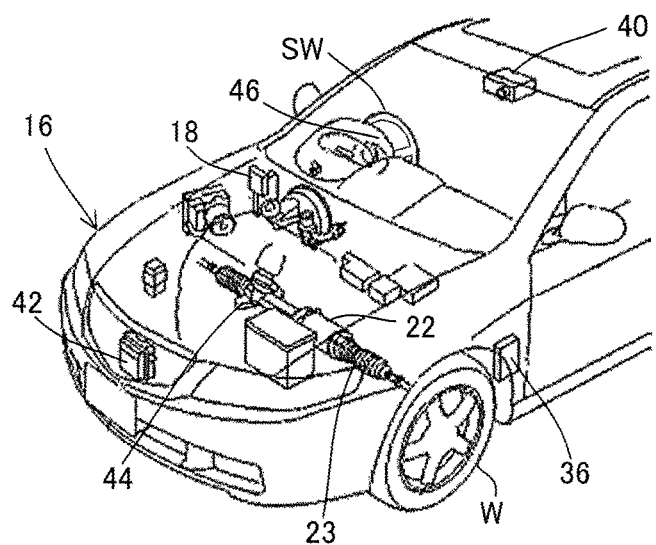
FIG. 2 is a perspective view of a vehicle on which the apparatus shown in FIG. 1 is mounted.

FIG. 1 is an overall schematic view showing the vehicle driving assistance apparatus according to an embodiment of this invention. FIG. 2 is a perspective view of a vehicle on which the apparatus shown in FIG. 1 is mounted.

Symbol 10 in FIG. 1 designates the vehicle driving assistance apparatus. The apparatus 10 is installed in a vehicle (automobile) 16 whose drive wheels W are supplied through an automatic transmission (denoted T/M in FIG. 1) 14 with power from an internal combustion engine (denoted ENG in FIG. 1; hereinafter called simply "engine") 12. The system 10 is equipped with a controller 18, brake actuator 20, EPS (Electric Power Steering) actuator 22, and warning device 24.

The controller 18 includes a driving control unit 28, engine control unit 30, shift control unit 32, brake control unit 34, and EPS control unit 36. These control units are all equipped with microcomputers and configured to enable communication with one another.

The driving control unit 28 functions as a first controller that conducts collision avoidance assistance control for providing assistance for avoiding collision between the vehicle 16 and objects or obstacles, as a second controller that conducts lane departure prevention control for preventing deviation of the vehicle 16 from the traffic lane or proper course of travel, as a third controller that executes power steering control for providing driver steering assistance, and as a fourth controller that conducts parking assistance control for providing assistance during parking of the vehicle 16. The first to fourth controllers will be explained later.

The engine control unit 30 and shift control unit 32 control the operation of the engine 12 and automatic transmission 14. However, no explanation of their operation will be given because it is not directly related to the purport of this invention.

The brake actuator 20 comprises a vacuum brake booster that amplifies brake pedal (not shown) depression force and a master cylinder (not shown) that uses the amplified depression force to produce brake force for operating brakes installed at drive wheels and driven wheels through a brake hydraulic system (not shown).

The brake control unit 34 is connected to the brake actuator 20. It is responsive to commands from the driving control unit 28 to brake or slow the motion of the vehicle 16 by operating independently of driver brake pedal operation so as to perform automatic braking by operating the brake actuator 20 through the brake hydraulic system.

The EPS actuator 22 comprises an electric motor mounted on the rack R of a rack-and-pinion mechanism for converting rotary motion of a steering wheel SW transmitted from a steering shaft or the like to reciprocal motion of the rack for steering the drive wheels W through tie rods.

The EPS control unit 36 is connected to the EPS actuator 22. As explained in detail later, it is responsive to commands from the driving control unit 28 for operating the EPS actuator 22 to impart steering torque to the driver. In the electric power steering system comprising the EPS actuator 22 and EPS control unit 36, the EPS actuator 22 functions as a device to impart torque to the steering wheel SW.

The warning device 24 is equipped with an audio speaker and an indicator (neither shown) situated near the driver's seat of the vehicle 16 and is connected to the driving control unit 28. The driving control unit 28 operates the warning device 24 to alert the driver by audible and visible warnings.

As explained in detail later, the driving control unit 28 operates the EPS actuator 22 via the EPS control unit 36 to turn the steering wheel SW, more specifically to impart a tug to the driver's hands via the steering wheel, thereby also alerting the driver by imparting torque.

In addition to the foregoing components, the apparatus 10 is also equipped with a number of sensors, as indicated in the drawings and explained below.

Reference numeral 40 designates an imaging unit comprising a camera 40a (Charge-Coupled Device camera or Complementary-Metal Oxide Semiconductor camera) and an image processor 40b. As shown in FIG. 2, the camera 40a is mounted near the windshield in the passenger compartment of the vehicle 16. It takes images through the windshield in the forward direction of vehicle travel. The image processor 40b receives the images taken by the camera 40a, subjects them to image processing, such as filtering and binarization, and outputs the resulting image data to the driving control unit 28.

Reference numeral 42 designates a radar unit 42. The radar unit 42 is, for example, mounted at the nose of the body of the vehicle 16, as shown in FIG. 2. It comprises a radar transmitter 42a that transmits a laser beam, microwaves or other electromagnetic waves into the surroundings of the vehicle 16 forward thereof in the direction of travel, for instance, and a radar processor 42b that receives the electromagnetic waves reflected from obstacles present around the vehicle 16. The radar processor 42b detects obstacles, or absence thereof, based on whether or not reflected electromagnetic waves are received. When the radar processor 42b detects an obstacle, it further determines its distance, direction and moving speed, and sends the information to the driving control unit 28.

A steering torque sensor 44 installed near the rack-and-pinion mechanism as shown in FIG. 2 produces an output or signal corresponding to the direction and magnitude of steering torque applied or inputted to the steering wheel SW by the driver. A steering angle sensor 46 installed near the steering shaft (not shown) produces an output or signal corresponding to the direction and magnitude of a steering angle applied or inputted by the driver through the steering wheel SW.

A yaw rate sensor 48 installed near the center of gravity of the vehicle 16 produces an output or signal corresponding to the yaw rate (angular velocity) of the vehicle 16 around its vertical axis (yaw axis). A vehicle speed sensor 50 installed near the driveshaft (not shown) of the drive wheels produces an output or signal of pulse once per predetermined number of drive wheel rotations. The outputs of these sensors are also sent to the driving control unit 28.

The driving control unit 28 conducts power steering control for easing driver steering effort by determining the steering torque from the output of the steering torque sensor 44, calculating an assist torque for reducing the determined steering torque, and sending a command to the EPS control unit 36 to operate the EPS actuator 22.

Figure 3:
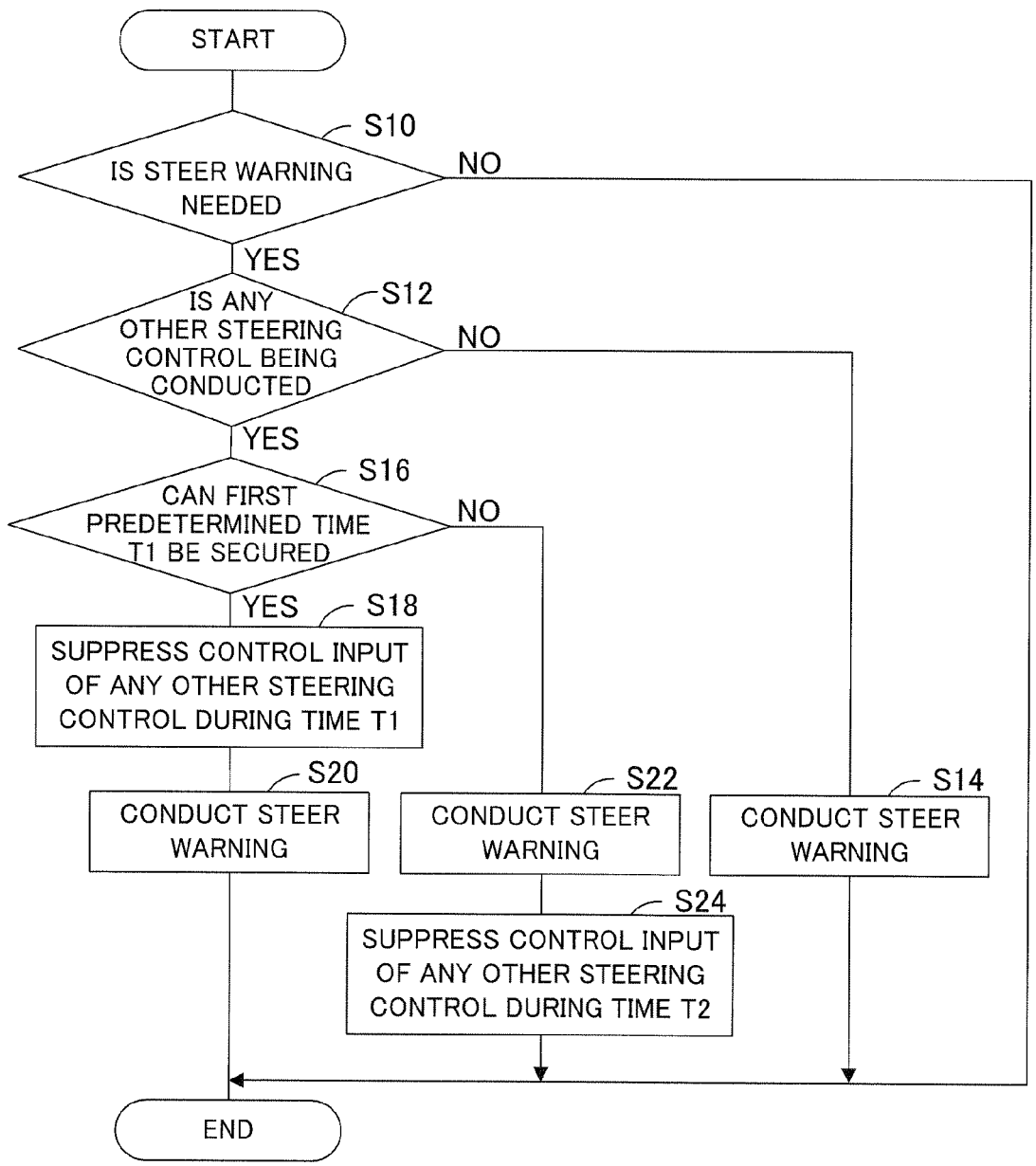
FIG. 3 is a flowchart showing the sequence of operations of the apparatus shown in FIG. 1.

FIG. 3 is a flowchart showing the sequence of operations of the apparatus 10 shown in FIGS. 1 and 2. The flowchart shown in FIG. 3 is executed by the driving control unit 28 of the controller 18 of the apparatus 10.

In S10 of the flowchart, it is determined whether the operation of a steer warning is needed.

As explained earlier, the driving control unit 28 functions as a first controller that conducts collision avoidance assistance control, as a second controller that conducts lane departure prevention control, as a third controller that executes power steering control, and as a fourth controller that conducts parking assistance control. These controls include operations that utilize the EPS actuator 22 to impart torque via the steering wheel SW. They are therefore called "steering controls" in this specification. The warning of S10 is a warning by one of these steering controls, e.g., by the collision avoidance assistance control.

Before continuing with the explanation of FIG. 3, the collision avoidance assistance control will be explained with reference to FIG. 4.

Figure 4:
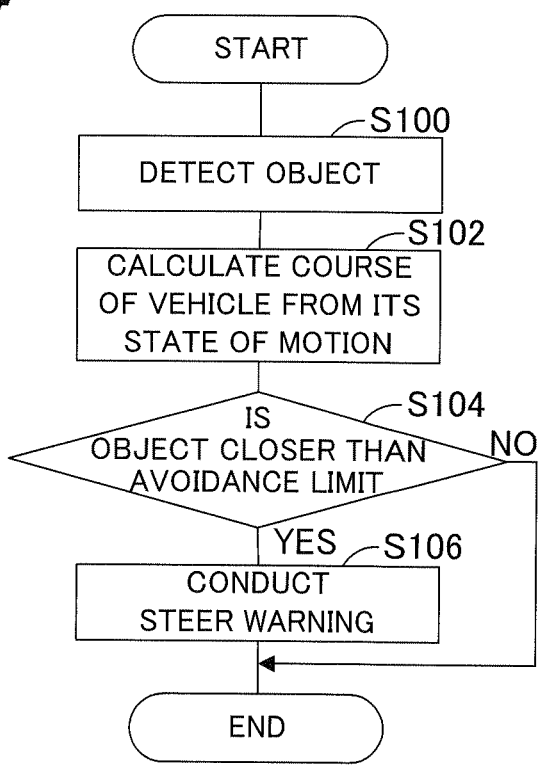
FIG. 4 is a flowchart showing the processing for collision avoidance assistance control from among the operations of the apparatus shown in FIG. 1.

In S100 of the flowchart of FIG. 4, any object or obstacle located ahead of the vehicle 16 in its direction of travel (e.g., a vehicle ahead) is detected based on the output of the radar processor 42b of the radar unit 42, and the position and speed of the detected obstacle relative to the vehicle 16 is determined.

Next, in S102, the course of the vehicle 16 is calculated or predicted from the state of motion of the vehicle 16, i.e., from the speed and yaw rate of the vehicle 16 determined from the outputs of the vehicle speed sensor 50 and yaw rate sensor 48.

Next, in S104, it is determined whether the object detected in the calculated course of the vehicle 16 is at a position closer than an avoidance limit.

When the result in S104 is NO, the remaining processing steps are skipped. When it is YES, meaning a possibility of collision with the obstacle exists, the program goes to S106, in which it is determined that the operation of the steer warning (under the collision avoidance assistance control) should be conducted. More specifically, it is determined that the EPS actuator 22 is operated via the EPS control unit 36 to impart torque to the steering wheel SW, thereby warning the driver. In this specification, a warning given by imparting torque to the steering wheel SW is called a "steer warning."

The lane departure prevention control conducted by the second controller is the same as that taught by the Japanese Laid-Open Patent Application No. 2006-131072 mentioned earlier and will not be explained in detail here. The power steering control is control for easing driver steering effort conducted in response to the steering torque determined as explained earlier. The parking assistance control is control for providing driving assistance during parking of the vehicle 16 and can be control like that taught by Japanese Patent No. 3420581.

The explanation of FIG. 3 will be continued. When the result in S10 is NO, the remaining processing steps are skipped. When it is YES, the program goes to S12, in which it is determined whether any other steering control is being conducted, namely whether any or all of lane departure prevention control, power steering control and parking assistance control are being conducted.

The determination made in S12 is performed by using an electric current sensor (not shown in FIG. 1 or other drawings) to detect the current passing through the EPS actuator (electric motor) 22. No current being detected means that the EPS actuator 22 is not operating, i.e., no steering control is being conducted. Current being detected means the opposite.

A NO result in S12 thus means that no other steering control is in progress. Since driver's perceptibility of warnings can therefore be considered high, the program goes to S14, in which the steer warning of the collision avoidance assistance control is immediately conducted. When the result in S12 is YES, the program goes to S16, in which the steer warning is preceded by a determination as to whether a first predetermined time T1 can be secured. The first predetermined time T1 is a time period for suppressing steering control input and is defined as 100 milliseconds, for example.

In performing the determination in S16, a time period during which the steer warning must be started (time indicative of steer warning urgency) is calculated from the proximity of the vehicle 16 to the obstacle, and it is determined that the first predetermined time T1 (100 milliseconds) can be secured when the first predetermined time T1 is equal to or smaller than the calculated time period.

Figure 5:
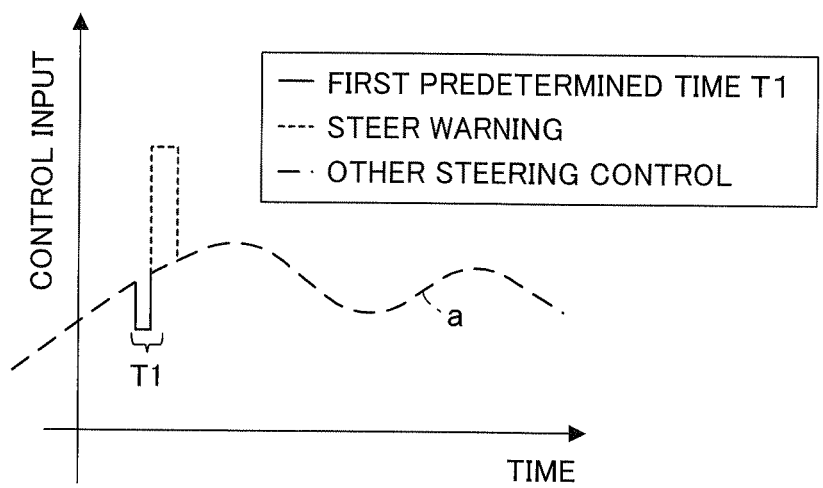
FIG. 5 is a time chart for explaining a first predetermined time T1 shown in the flowchart of FIG. 3.

When the result in S16 is YES, the program goes to S18, in which the control input of any other steering control is suppressed during the first predetermined time T1. In other words, as shown in FIG. 5, the control input by any of the other steering control, power steering control, indicated by the broken curve a is reduced. In this embodiment the control input (manipulated variable) corresponds to the amount of current supplied to the EPS actuator 22 because the EPS actuator 22 is an electric motor. Next, in S20, the steer warning of the collision avoidance assistance control is conducted.

Figure 6:
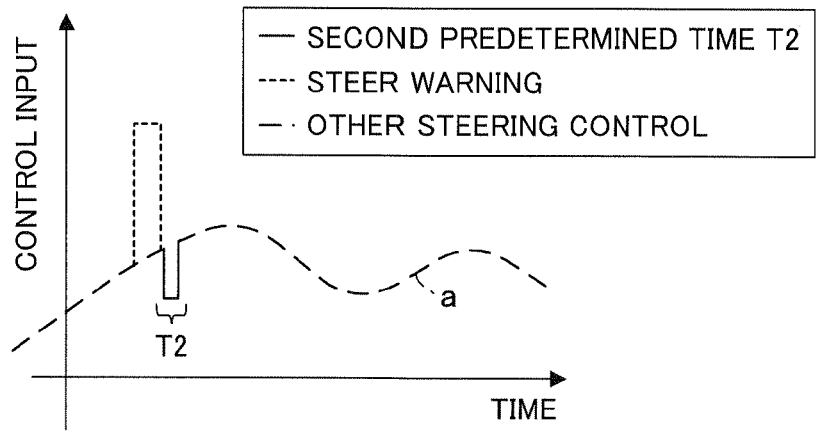
FIG. 6 is a time chart for explaining a second predetermined time T2 shown in the flowchart of FIG. 3.

When the result in S16 is NO, i.e., when it is found that the first predetermined time T1 cannot be secured, the program goes to S22, in which the steer warning of the collision avoidance assistance control is conducted, and to S24, in which, as shown FIG. 6, the control input by any of the other steering control, indicated by the broken curve a, is suppressed (i.e., the control input is reduced) during a second predetermined time T2. The second predetermined time T2 is a time period for suppressing steering control input after the steer warning and is also defined as 100 milliseconds, for example.

Thus, when a warning for alerting the driver is made by imparting torque to the steering wheel SW via the EPS actuator 22, the control input of the other steering control is suppressed, i.e. is reduced during either the first predetermined time T1 before warning or the second predetermined time T2 after warning. In other words, there is provided a control input suppressor (S10-S24) or step of control input suppressing that suppresses the control input of at least one of the first steering control and the second steering control, when a warning for alerting the driver is made by at least one of the first controller and the second controller by imparting torque to the steering wheel via the EPS actuator (device) 22, during the first predetermined time T1 before the warning or the second predetermined time T2 after the warning. Owing to this configuration, the driver can be enabled to perceive the warning without fail even when another steering control is performed in parallel.

To amplify on the processing of FIG. 3, the first predetermined time T1 of S18 and the second predetermined time T2 of S24 can be varied in response to the degree of danger of collision in the collision avoidance assistance control, or the degree of urgency of the steer warning, or the degree of importance of the other steering control and the like. The degree of urgency of the steer warning includes the degree of urgency of the steer warning in any other steering control, e.g., the degree of urgency of a warning for prompting driver steer input in parking assistance control.

Specifically, when the degree of danger of collision is high in collision avoidance assistance control, or when the degree of urgency of the steer warning is high, or when the degree of importance of other steering controls, e.g., lane departure prevention control, is lower than that of the steer warning, T1 and/or T2 is extended from 100 milliseconds to, for instance, 200 milliseconds, so as to enhance the perceptibility. The degrees of importance are defined in advance.

Similarly, the amount of suppression of the other steering control input during the first predetermined time T1 of S18 or the second predetermined time T2 of S24 can be varied in response to the degree of danger of collision in the collision avoidance assistance control, the degree of urgency of the steer warning, or the degree of importance of the other steering control and the like.

Figure 7:
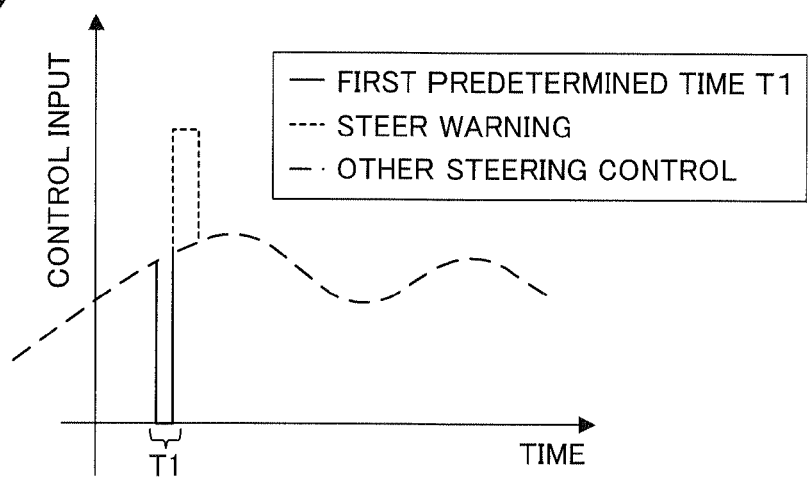
FIG. 7 is a time chart for explaining an example of change in degree of suppression of a control input during the first predetermined time T1 of the FIG. 3 flowchart.
Figure 8:
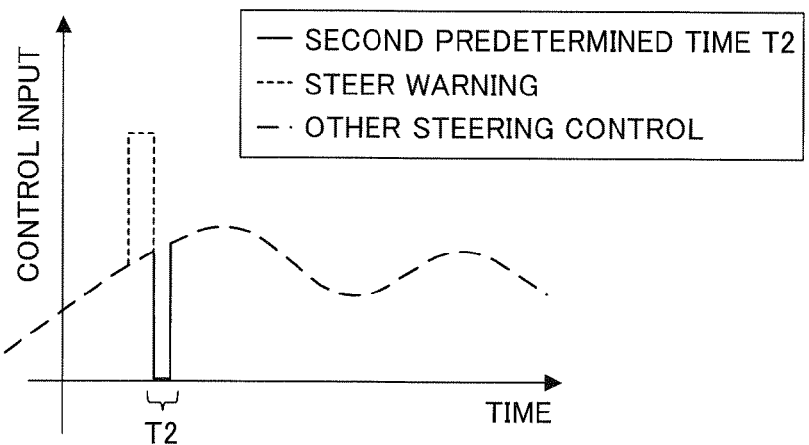
FIG. 8 is a time chart for explaining an example of change in degree of suppression of the control input during the second predetermined time T2 of the FIG. 3 flowchart.

Specifically, when the degree of danger of collision is high in collision avoidance assistance control, or when the degree of urgency of the steer warning is high, or when the degree of importance of any other steering control, e.g., lane departure prevention control, is lower than that of the steer warning, the amount of suppression during T1 is increased, i.e., is more reduced from that in FIG. 5 to that in FIG. 7, for example, the amount of suppression during T2 is increased, i.e., is more reduced from that in FIG. 6 to that in FIG. 8, for example, so as to enhance the perceptibility. As will be noted from FIGS. 7 and 8, the increase in the amount of suppression during T1 and T2 is defined to include values that reduce the control input to zero. Here, too, the degrees of importance are defined in advance.

Figure 9:
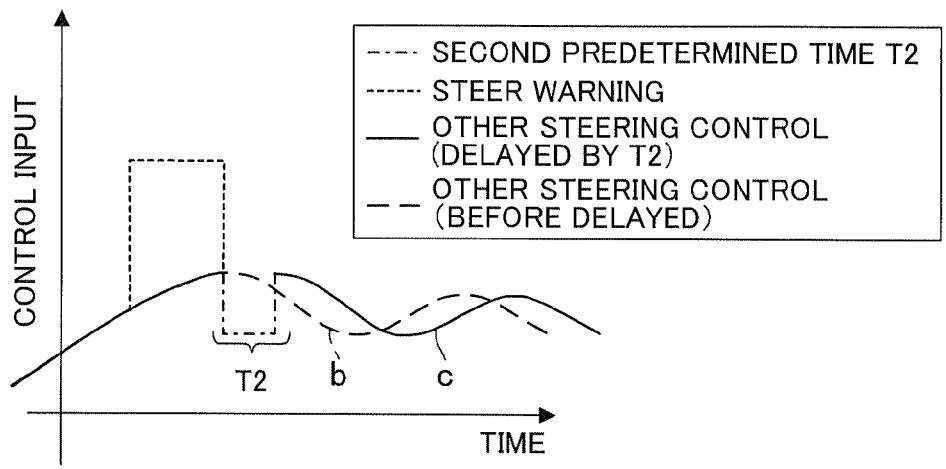
FIG. 9 is a time chart for expressing another steering control which is conducted before making a steer warning shown in the FIG. 3 flowchart.

As shown in FIG. 9, when, as indicated by broken curve b, another steering control is in progress before conducting the steer warning, the processing for suppression of the control input of the other steering control during the second predetermined time T2 of S24 includes processing for delaying or interrupting the other steering control by T2, as indicated by solid curve c.

Figure 10:
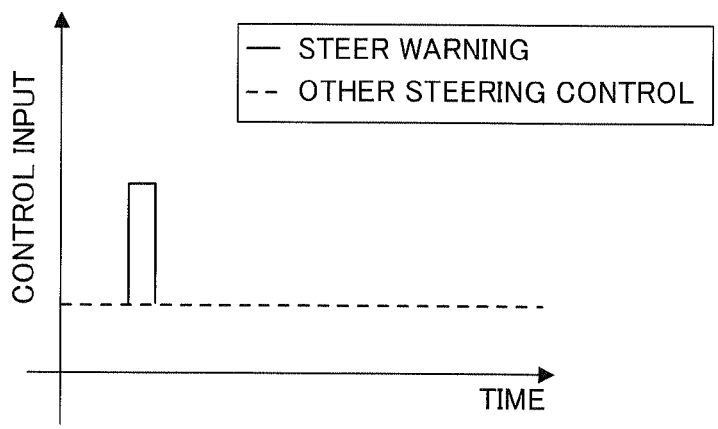
FIG. 10 is a time chart for expressing the steer warning shown in the FIG. 3 flowchart.
Figure 11:
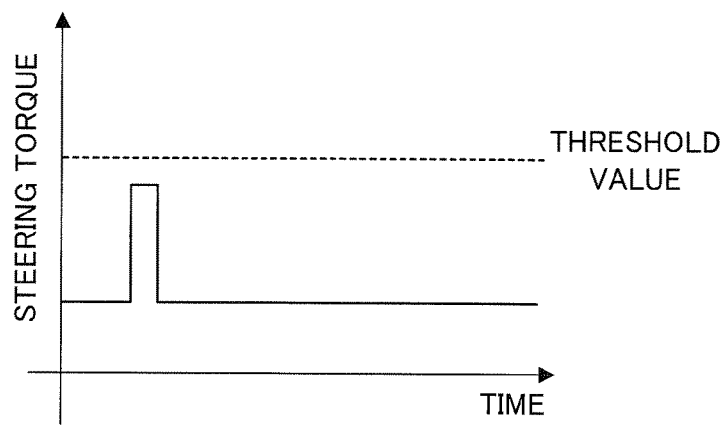
FIG. 11 is a time chart for expressing steering torque when the steer warning is made in the FIG. 3 flowchart.
Figure 12:
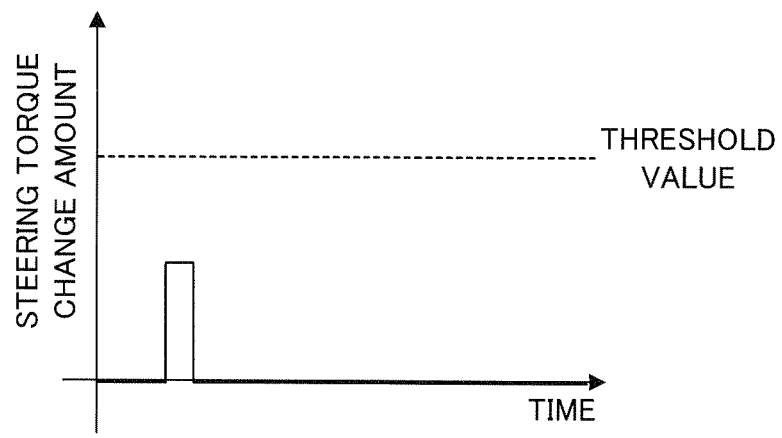
FIG. 12 is a time chart for expressing the steering torque change amount when the steer warning is made in the FIG. 3 flowchart.

Further, in the case where the steer warning such as shown in FIG. 10 is needed, if it should be found that the steering torque is less than a threshold value (FIG. 11) or that the steering torque change amount is less than a threshold value (FIG. 12), i.e., when it is found that the steering torque before steer warning is less than a threshold value or that the steering torque change amount between before and after steer warning is less than a threshold value, T2 is extended to 200 milliseconds because the perceptibility of the steer warning is liable to be low under such circumstances.

Similarly, in the case where a steer warning such as shown in FIG. 10 is needed, if it should be found that the steering torque is less than a threshold value (FIG. 11) or that the steering torque change amount is less than a threshold value (FIG. 12), i.e., when it is found that the steering torque before steer warning is less than a threshold value or that the steering torque change amount between before and after steer warning is less than a threshold value, the amount of suppression of any other steering control input during T2 is increased, i.e., is more reduced as shown in FIG. 8 because the perceptibility of the steer warning is liable to be low under such circumstances.

Figure 13:
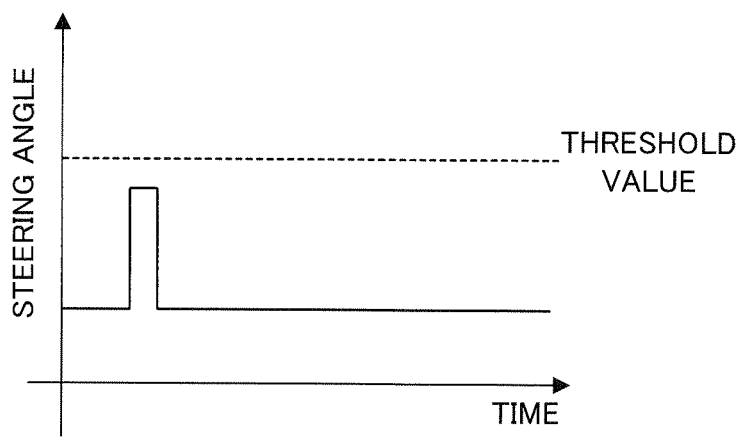
FIG. 13 is a time chart for expressing steering angle when the steer warning is made in the FIG. 3 flowchart.
Figure 14:
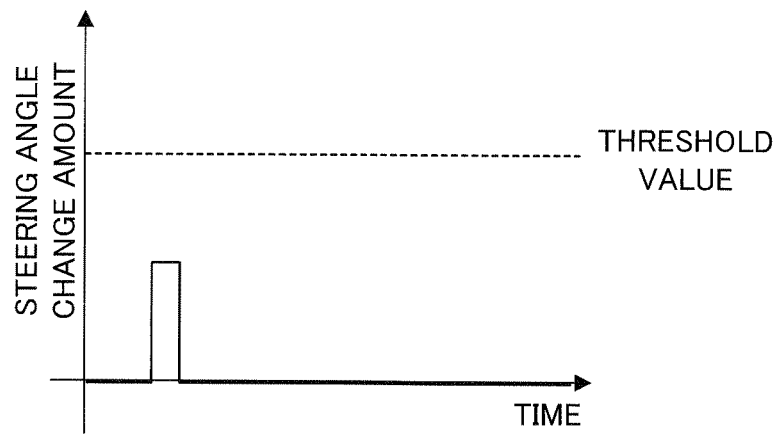
FIG. 14 is a time chart for expressing the steering angle change amount when the steer warning is made in the FIG. 3 flowchart.

Further, in the case where a steer warning such as shown in FIG. 10 is needed, if it should be found that the steering angle is less than a threshold value (FIG. 13) or that the steering angle change amount is less than a threshold value (FIG. 14), i.e., when it is found that the steering angle before steer warning is less than a threshold value or that the steering angle change amount between before and after steer warning is less than a threshold value, T2 is extended to 200 milliseconds because the perceptibility of the steer warning is liable to be low under such circumstances.

Similarly, in the case where a steer warning such as shown in FIG. 10 is needed, if it should be found that the steering angle is less than a threshold value (FIG. 13) or that the steering angle change amount is less than a threshold value (FIG. 14), i.e., when it is found that the steering angle before steer warning is less than a threshold value or that the steering angle change amount between before and after steer warning is less than a threshold value, the amount of suppression of any other steering control input during T2 is increased, i.e., is more reduced as shown in FIG. 8 because the perceptibility of the steer warning is liable to be low under such circumstances.

As stated above, the embodiment is thus configured to have an apparatus (10) for assisting driving of a vehicle (16) having a steering wheel (SW) adapted to be manipulated by a driver, and a device (EPS actuator 22) to impart torque to the steering wheel when supplied with a control input; comprising: a first controller (driving control unit 28, S100-S106) that supplies the control input to the device to conduct a first steering control (or the step of conducting the first steering control); a second controller (driving control unit 28) that supplies the control input to the device to conduct a second steering control (or the step of conducting the second steering control) ; and a control input suppressor or step of suppressing the control input (driving control unit 28, S10-S24) that suppresses the control input of at least one of the first steering control and the second steering control, when a warning for alerting the driver is made by at least one of the first controller and the second controller by imparting torque to the steering wheel via the device, during a first predetermined time T1 before the warning or a second predetermined time T2 after the warning. Owing to this configuration, the driver can be enabled to perceive the warning without fail even when another steering control is performed in parallel.

In the apparatus, the control input suppressor suppresses the control input of at least one of the first steering control and the second steering control during the second predetermined time T2, when the first predetermined time T1 can not be secured (driving control unit 28, S16, S22, S24).

In the apparatus, the first controller conducts collision avoidance assistance control, as the first steering control, for providing assistance for avoiding collision between the vehicle (16) and an object located ahead of the vehicle in its direction of travel when a possibility of collision with the object exists (S100-S106), and at least one of the first predetermined time T1 and the second predetermined time T2 is varied at least in response to one of degree of urgency of the first steering control and degree of importance of the second steering control (S18, S24).

In the apparatus, the second controller conducts, as the second steering control, one of lane departure prevention control for preventing deviation of the vehicle (16) from a proper course of travel, power steering control for providing driver steering assistance, and parking assistance control for providing assistance during parking of the vehicle.

In the apparatus, the first controller conducts collision avoidance assistance control, as the first steering control, for providing assistance for avoiding collision between the vehicle and an object located ahead of the vehicle in its direction of travel when a possibility of collision with the object exists (S100-S106), and the control input of at least one of the first steering control and the second steering control is varied in response to at least one of degree of urgency of the first steering control and degree of importance of the second steering control (S18, S24).

The apparatus further includes: a steering torque sensor (44) that produces an output corresponding to a steering torque applied to the steering wheel; and the second predetermined time T2 is varied based on the steering torque before the warning or the steering torque change amount between before and after the warning (S24).

The apparatus further includes: a steering torque sensor (44) that produces an output corresponding to a steering torque applied to the steering wheel; and the control input of at least one of the first steering control and the second steering control is varied based on the steering torque before the warning or the steering torque change amount between before and after the warning (S24).

The apparatus further includes: a steering angle sensor (46) that produces an output corresponding to a steering angle applied to the steering wheel; and the second predetermined time T2 is varied based on the steering angle before the warning or the steering angle change amount between before and after the warning (S24).

The apparatus further includes: a steering angle sensor (46) that produces an output corresponding to a steering angle applied to the steering wheel; and the control input of at least one of the first steering control and the second steering control is varied based on the steering angle before the warning or the steering angle change amount between before and after the warning (S24).

Although it has been explained in the foregoing that control input is suppressed during the first predetermined time T1 before steer warning or the second predetermined time T2 after steer warning, it is possible instead to suppress control input during both the first predetermined time T1 and the second predetermined time T2.

Although it has been explained in the foregoing that the EPS actuator (electric motor) of an electric power steering system is used as the torque imparting device for imparting torque to the steering wheel SW, it is possible instead to use a hydraulic power steering system.

Although control input has been expressed in terms of applied current, it can instead be expressed in terms of EPS actuator rotation angle or the like. When a hydraulic power steering system is used as the torque imparting device, control input can be expressed in terms of hydraulic pressure.

Japanese Patent Application No. 2008-010802 filed on Jan. 21, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for assisting driving of a vehicle having a steering wheel adapted to be manipulated by a driver, and a device to impart torque to the steering wheel when supplied with a control input; comprising:
 a first controller that supplies the control input to the device to conduct a first steering control;
 a second controller that supplies the control input to the device to conduct a second steering control; and
 a control input suppressor that suppresses the control input of one of the first steering control and the second steering control to impart the torque to the steering wheel in one of a left direction and a right direction, when a warning for alerting the driver is made by another one of the first controller and the second controller by imparting torque to the steering wheel in a same direction via the device, during a first predetermined time before the warning or a second predetermined time after the warning such that the torque imparted in the same direction is decreased.

2. The apparatus according to claim 1, wherein the control input suppressor suppresses the control input of at least one of the first steering control and the second steering control during the second predetermined time, when the first predetermined time can not be secured.

3. The apparatus according to claim 1, wherein the first controller conducts collision avoidance assistance control, as the first steering control, for providing assistance for avoiding collision between the vehicle and an object located ahead of the vehicle in its direction of travel when a possibility of collision with the object exists, and at least one of the first predetermined time and the second predetermined time is varied in response to at least one of degree of urgency of the first steering control and degree of importance of the second steering control.

4. The apparatus according to claim 3, wherein the second controller conducts, as the second steering control, one of lane departure prevention control for preventing deviation of the vehicle from a proper course of travel, power steering control for providing driver steering assistance, and parking assistance control for providing assistance during parking of the vehicle.

5. The apparatus according to claim 1, wherein the first controller conducts collision avoidance assistance control, as the first steering control, for providing assistance for avoiding collision between the vehicle and an object located ahead of the vehicle in its direction of travel when a possibility of collision with the object exists, and the control input of at least one of the first steering control and the second steering control is varied in response to at least one of degree of urgency of the first steering control and degree of importance of the second steering control.

6. The apparatus according to claim 5, wherein the second controller conducts, as the second steering control, one of lane departure prevention control for preventing deviation of the vehicle from a proper course of travel, power steering control for providing driver steering assistance, and parking assistance control for providing assistance during parking of the vehicle.

7. The apparatus according to claim 1, further including:
 a steering torque sensor that produces an output corresponding to a steering torque applied to the steering wheel; and
 the second predetermined time is varied based on the steering torque before the warning or a steering torque change amount between before and after the warning.

8. The apparatus according to claim 1, further including:
 a steering torque sensor that produces an output corresponding to a steering torque applied to the steering wheel; and
 the control input of at least one of the first steering control and the second steering control is varied based on the steering torque before the warning or a steering torque change amount between before and after the warning.

9. The apparatus according to claim 1, further including:
 a steering angle sensor that produces an output corresponding to a steering angle applied to the steering wheel; and
 the second predetermined time is varied based on the steering angle before the warning or a steering angle change amount between before and after the warning.

10. The apparatus according to claim 1, further including:
 a steering angle sensor that produces an output corresponding to a steering angle applied to the steering wheel; and
 the control input of at least one of the first steering control and the second steering control is varied based on the steering angle before the warning or a steering angle change amount between before and after the warning.

11. A method of assisting driving of a vehicle having a steering wheel adapted to be manipulated by a driver, and a device to impart torque to the steering wheel when supplied with a control input; comprising the steps of:
 conducting a first steering control that supplies the control input to the device;
 conducting a second steering control that supplies the control input to the device; and
 suppressing the control input of one of the first steering control and the second steering control to impart the torque to the steering wheel in one of a left direction and a right direction, when a warning for alerting the driver is made by another one of the first steering control and the second steering control by imparting torque to the steering wheel in a same direction via the device, during a first predetermined time before the warning or a second predetermined time after the warning such that the torque imparted in the same direction is decreased.

12. The method according to claim 11, wherein the step of control input suppressing suppresses the control input of at least one of the first steering control and the second steering control during the second predetermined time, when the first predetermined time can not be secured.

13. The method according to claim 11, wherein the step of conducting the first steering control conducts collision avoidance assistance control for providing assistance for avoiding collision between the vehicle and an object located ahead of the vehicle in its direction of travel when a possibility of collision with the object exists, and at least one of the first predetermined time and the second predetermined time is varied in response to at least one of degree of urgency of the first steering control and degree of importance of the second steering control.

14. The method according to claim 13, wherein the step of conducting the second steering control conducts one of lane departure prevention control for preventing deviation of the vehicle from a proper course of travel, power steering control for providing driver steering assistance, and parking assistance control for providing assistance during parking of the vehicle.

15. The method according to claim 11, wherein the step of conducting the first steering control conducts collision avoidance assistance control for providing assistance for avoiding collision between the vehicle and an object located ahead of the vehicle in its direction of travel when a possibility of collision with the object exists, and the control input of at least one of the first steering control and the second steering control is varied in response to at least one of degree of urgency of the first steering control and degree of importance of the second steering control.

16. The method according to claim 15, wherein the step of conducting the second steering control conducts one of lane departure prevention control for preventing deviation of the vehicle from a proper course of travel, power steering control for providing driver steering assistance, and parking assistance control for providing assistance during parking of the vehicle.

17. The method according to claim 11, further including step of:
sensing a steering torque applied to the steering wheel; and
the second predetermined time is varied based on the steering torque before the warning or a steering torque change amount between before and after the warning.

18. The method according to claim 11, further including the step of:
sensing a steering torque applied to the steering wheel; and
the control input of at least one of the first steering control and the second steering control is varied based on the steering torque before the warning or a steering torque change amount between before and after the warning.

19. The method according to claim 11, further including the step of:
sensing a steering angle applied to the steering wheel; and
the second predetermined time is varied based on the steering angle before the warning or a steering angle change amount between before and after the warning.

20. The method according to claim 11, further including the step of:
sensing a steering angle applied to the steering wheel; and
the control input of at least one of the first steering control and the second steering control is varied based on the steering angle before the warning or a steering angle change amount between before and after the warning.

* * * * *